(12) United States Patent
Miyata et al.

(10) Patent No.: US 7,264,270 B2
(45) Date of Patent: Sep. 4, 2007

(54) AIRBAG APPARATUS, MOTORCYCLE EQUIPPED WITH AIRBAG APPARATUS AND MANUFACTURING METHOD OF AIRBAG APPARATUS

(75) Inventors: Yasuhito Miyata, Shiga (JP); Tadahiro Igawa, Shiga (JP); Tomohiro Sawa, Shiga (JP)

(73) Assignee: Takata Corporation, Tokyo (JP)

( * ) Notice: Subject to any disclaimer, the term of this patent is extended or adjusted under 35 U.S.C. 154(b) by 280 days.

(21) Appl. No.: 10/811,736

(22) Filed: Mar. 29, 2004

(65) Prior Publication Data

US 2004/0256848 A1 Dec. 23, 2004

(30) Foreign Application Priority Data

Jun. 19, 2003 (JP) ............................ 2003-174871

(51) Int. Cl.
*B60R 21/016* (2006.01)
(52) U.S. Cl. ................................. 280/743.2; 280/730.1
(58) Field of Classification Search ............. 280/730.1, 280/743.2, 743.1
See application file for complete search history.

(56) References Cited

U.S. PATENT DOCUMENTS

| | | | |
|---|---|---|---|
| 3,879,056 A * | 4/1975 | Kawashima et al. ..... | 280/743.2 |
| 6,536,800 B2 * | 3/2003 | Kumagai et al. ........ | 280/743.1 |
| 6,572,144 B2 * | 6/2003 | Igawa ...................... | 280/743.1 |
| 6,679,522 B2 * | 1/2004 | Igawa ...................... | 280/743.1 |
| 6,857,659 B2 * | 2/2005 | Webber ................... | 280/743.2 |
| 7,021,657 B2 * | 4/2006 | Kassman et al. ........ | 280/743.2 |
| 7,029,029 B2 * | 4/2006 | Yamazaki et al. ....... | 280/730.1 |
| 2003/0168842 A1 * | 9/2003 | Igawa ...................... | 280/743.2 |
| 2007/0080530 A1 * | 4/2007 | Issler et al. .............. | 280/743.2 |

FOREIGN PATENT DOCUMENTS

| | | | | |
|---|---|---|---|---|
| GB | 2261855 | * | 2/1993 | .............. 280/743.2 |
| JP | 2002-137777 | | 5/2002 | |
| JP | 2002137777 | * | 5/2002 | |
| JP | 2002-347549 | | 12/2002 | |

* cited by examiner

*Primary Examiner*—Paul N. Dickson
*Assistant Examiner*—Timothy D. Wilhelm
(74) *Attorney, Agent, or Firm*—Fitch, Even, Tabin & Flannery

(57) ABSTRACT

An airbag constructing technology is provided that is useful for improving the protection of a driver upon the occurrence of a vehicle accident, and related techniques. The airbag apparatus to be mounted on an automotive two-wheeler has an airbag which is inflated in a driver-protecting area formed in front of the driver upon the occurrence of a front vehicle collision. This airbag has a tether connecting inner wall surfaces facing each other of the airbag. Inflation of the vehicle rear side wall of the airbag toward the driver is regulated via the tether. Inflation of the vehicle front side wall of the airbag toward the front vehicle is allowed. This tether is prepared by sewing first to third tether component pieces to each other sewn to the inner wall surface of the airbag.

16 Claims, 10 Drawing Sheets

AIRBAG APPARATUS, MOTORCYCLE EQUIPPED WITH AIRBAG APPARATUS AND MANUFACTURING METHOD OF AIRBAG APPARATUS

FIELD OF THE INVENTION

The present invention relates to a construction technology for an airbag apparatus to be mounted on a vehicle.

BACKGROUND OF THE INVENTION

Various techniques for ensuring the safety of a driver by mounting an airbag apparatus on a vehicle such as a motorcycle are conventionally known. For example, a technology is known in which an airbag housed in a case attached to a vehicle body frame is unfolded and inflated by an expanding gas upon a front collision of an automotive two-wheeler, thereby restraining the driver (for example, see Japanese Unexamined Patent Application Publication No. 2002-137777). This technology presents the possibility, in terms of a motorcycle, of ensuring a large protecting area provided by the airbag by connecting walls spaced apart from each other forward and backward of the airbag within the airbag by means of a tether. Furthermore, there is an increasing demand to improve driver protection by developing efficient driver-restraint configurations by means of airbags deployed upon the occurrence of an accident.

SUMMARY OF THE INVENTION

The present invention has been developed in view of these circumstances, and has an object to provide an airbag construction technology useful for improving the protection of the driver upon the occurrence of an accident, and related techniques.

For the purpose of achieving the above-mentioned object, inventions specified in the individual claims are configured as follows. The inventions specified in these claims are typically applicable to configurations of airbag apparatuses mounted on various types of motorcycle. In this specification, the term "motorcycles" as typical examples of vehicles shall broadly includes straddling vehicles on which the driver sits astride a seat, including for example an automotive two-wheeler of the type in which a fuel tank is provided in front of the driver's seat, and an automotive two-wheeler of the scooter type in which a space is formed between the driver's seat and the handle-supporting head pipe. In addition to automotive two-wheelers, a vehicle, having three or more running wheels, on which the driver sits astride a seat (for example, a three-wheel motorcycle used for home delivery of pizzas, and a three-wheel or four-wheel buggy-type motorcycles for use in bad weather) and vehicles such as snow-mobiles which run on sleighs or caterpillars and on which the driver sits astride shall also be included in the category of "motorcycles".

In a first form of the invention, upon a front collision of a vehicle, an expanding gas is fed into an airbag by gas feeding means such as an inflater, and the airbag forming an airbag apparatus is unfolded and inflated while projecting toward a driver protecting area formed in front of the driver.

The airbag of this invention has, among others, a connecting member which connects the inner wall surfaces facing each other of the airbag, and inflation of the vehicle rear side wall of the airbag toward the driver is regulated via this connecting member. A strip-shaped or a string-shaped connecting member can be appropriately used. Typically, it is possible to adopt a configuration in which a strip-shaped tether as a connecting member is arranged in the airbag and an end of this tether is sewn on the inner wall surface of the portion expanding toward the driver of the vehicle rear side wall portion of the airbag. As a result, the portion expanding toward the driver is pulled inward of the airbag by a tension caused by the connecting member. Inflation of the airbag toward the driver is therefore regulated from inside the airbag by the connecting member.

The portion of which the inflation is regulated from inside the airbag by the connecting member from among the inner wall surfaces of the airbag forms a concavity concave relative to the surrounding portions upon inflation of the airbag. In the present invention, a concavity is formed on the vehicle rear side wall of the airbag by the connecting member upon inflation of the airbag. This concavity is effective for securely restraining the driver by engagement with driver's head, chest, shoulder and other body portions.

In this invention, the arrangement of the connecting member allows inflation of the vehicle front side wall of the airbag toward the front of the vehicle. When the vehicle front side wall of the airbag is prevented from expanding toward the vehicle front, a concavity is formed in the front side wall of the airbag, and a gap may be formed between the airbag and the body component members. When such a gap is formed, the inflated airbag becomes difficult to be in engagement with the body component members such as a panel, thus causing a risk of a decrease in the driver restraining property. The airbag of this invention has therefore a configuration in which inflation of the vehicle front side wall of the airbag toward the vehicle front is allowed by the connecting member. Such a configuration can be achieved, for example, by connecting an end of the connecting member to the inner wall surface of a portion off the portion moving toward the vehicle front of the vehicle front side wall. This configuration permits improvement of the driver restraining performance of the airbag by ensuring engagement of the inflated airbag with the body component members, and is thus effective for improving protection of the driver.

The term "body component members" as herein used shall broadly include various members directly or indirectly fitted to the vehicle body. Typical examples of the body component members include a panel for installing instruments and handles fitted to the vehicle body. Parts becoming body component members only after the airbag apparatus is mounted on the motorcycle body, such as component parts originally forming parts of the airbag apparatus which become part of the vehicle body upon mounting of the airbag apparatus on the motorcycle body are also included in the category of "body component members" as used in this invention.

The term "allowance" and "regulation" as herein used shall mean that the connecting member suffices to allow or regulate inflation of the airbag, irrespective of the intensity of allowance or regulation.

In the airbag apparatus of the first form, the connecting member should preferably have a configuration in which the connecting member connects at least a first inner wall surface and a second inner wall surface.

The first wall forms a portion facing the driver from the vehicle rear side wall portions. The second wall forms a portion off the portions directed toward the vehicle front of the vehicle front wide wall. The second wall may be a portion forming the vehicle front side wall, or may be a wall different from the vehicle front side wall such as portions composing the right and left walls of the inflated airbag, or a portion composing upper and lower walls of the inflated airbag. In this invention, a typical configuration is that the connecting member linearly extends between the inner wall surface of the first wall and the inner wall surface of the second wall. Apart from the above, the connecting member may have a configuration in which it does not extend linearly between the first inner wall surface and the second inner wall surface so far as the first inner wall surface and the second inner wall surface are consequently connected as a result, irrespective of what is the path of extension of the connecting member between them.

According to the above-mentioned configuration of this invention, the tension of the connecting member acts between the inner wall surface of the first wall facing the driver and the inner wall surface of the second wall off the portion facing the vehicle front. Connection of the inner wall surface of the first wall and the inner wall surface of the second wall by means of the connecting member permits regulation of inflation of the vehicle rear side wall toward the driver, and allows inflation of the vehicle first side wall of the airbag toward the vehicle front. It is therefore possible to achieve an engagement of the connecting member effective for improving protection of the driver.

In accordance with another form of the invention, the airbag apparatus has a configuration in which the connecting member has a first connecting section and a second connecting section.

The first connecting section connects the inner wall surface of the vehicle right side wall formed to the right of the vehicle of the inflated airbag and the inner wall surface of the vehicle left side wall formed to the left of the vehicle to each other. The second connecting section connects the first connecting section and the inner wall surface of the first wall. That is, the inner wall surface of the first wall is connected to the inner wall surface of the vehicle right side wall and the inner wall surface of the vehicle left side wall via the second connecting section and the first connecting section. As a result, inflation of the first wall connected to the first connecting section by the second connecting section toward the driver is regulated, and inflation of the wall portion on the front side of the vehicle right side wall and the vehicle left side wall connected by the first connecting section toward the vehicle front is allowed.

According to the configuration of this invention as described above, it is possible to achieve a uniform right-left length of the inflated airbag by use of the first connecting section, and expansion of the airbag in the right-left direction during restraint of the driver can be prevented by use of the first connecting section. For example, in a configuration in which the right-left length of the inflated airbag, the engagement state of the airbag with the vehicle body component members such as the handle is not stable, and the driver restraining performance by the airbag is limited. In this invention, in contrast, it is possible to obtain a stable driver restraining performance of the airbag by achieving a constant right-left length of the inflated airbag by means of the first connecting section. Particularly, in this invention, such a configuration can be achieved through rational arrangement of the connecting member.

In accordance with another form of the invention, the airbag apparatus has an engagement section is formed by the vehicle right side wall and the vehicle left side wall connected via the first connecting section. This engagement section has a configuration of engaging with the body component members upon inflation of the airbag. Typically, a surface-irregular shape enabling the body component members including the handle to fit therein is formed. Such a configuration can be achieved in an embodiment in which the first connecting section is connected so that the engagement section is formed at a position corresponding to the arrangement of the body component members from among the body right side wall and the body left side wall. As a result, the airbag restrains the driver in a state in which the airbag engages with the body component members via the engagement section upon inflation. According to the configuration of this invention, therefore, it is possible to achieve further improvement of the driver restraining performance of the airbag.

The invention of another form is the airbag apparatus as earlier described, wherein the connecting member forms a polygon, for example, a triangle with the fitting sections of the connecting member to the inner wall surface of the airbag as the apexes. That is, a closed shape is formed by the connecting member of this invention. In this invention, there are conceivable embodiments in which the polygon formed by the connecting member having apexes formed by all or part of the fitting sections. The term "apex" as herein used broadly means an apex in an embodiment in which the fitting sections of the connecting member are in point contact with the inner wall surface of the airbag, or an apex in an embodiment in which the fitting sections of the connecting member is in face contact with the inner wall surface of the airbag.

When the configuration in which the connecting member has a closed shape is adopted as in this invention, the tension acting on the connecting member upon inflation of the airbag is dispersed in good balance, thus making it possible to achieve a rational configuration of the connecting member.

The invention in another form is the airbag apparatus as earlier described, wherein the connecting member has a configuration divisible into a plurality of divided members. Each of these divided members is attached to the inner wall surface of the airbag at the fitting section of that divided member. The plurality of divided members are connected to each other at points other than the fitting sections. More specifically, this invention has a configuration in which the fitting sections of the divided members to the inner surface of the airbag are shifted from the connecting sections of the divided members to each other.

For example, in the configuration in which the divided members are connected to each other at the fitting sections of the divided members to the inner wall surface of the airbag, it is necessary to simultaneously carry out the operation of fitting the divided members to the inner wall of the airbag and the operation of adjusting the length of each component part of the connecting member. According to the configuration of this invention, therefore, since the fitting sections to the inner wall surface of the airbag are shifted from the connecting sections of the divided members to each other, the length of each component part of the connecting member an be easily adjusted upon fitting the connecting member to the airbag, and this is effective for ensuring a smooth operation.

The invention of another form is a motorcycle having the airbag apparatus as earlier described. There is thus provided a motorcycle which permits achievement of a higher driver restraining performance by the airbag through certain engagement of the inflated airbag with the vehicle body component members, and enables to improve protection of the driver upon the occurrence of an accident.

The invention of another form is a rational manufacturing method of an airbag apparatus which displays substantially the same effects as the airbag apparatus of the first form.

In this invention, the mounting process comprises the steps of regulating inflation of the vehicle rear side wall of the airbag toward the driver by means of a connecting member, and a step of fitting the connecting member to the inner wall surfaces facing each other of the airbag so as to allow inflation of the vehicle rear side wall of the airbag toward the vehicle front. This manner of mounting the connecting member can be accomplished by sewing the connecting member made of cloth to the airbag. As a result, the driver restraining performance of the airbag can be improved by ensuring engagement of the inflated airbag with the body component members, thus providing a manufacturing method of an airbag apparatus effective for improving protection of the driver. It is of course possible to configure a manufacturing method of an airbag apparatus having any of the constituent elements similar to those of the airbag apparatus recited in the claims dependent upon claim 1.

The invention of another form is the manufacturing method as described above, wherein the fitting step of the connecting member comprises a first sub-step and a second sub-step. This invention provides a rational manufacturing method of an airbag apparatus displaying substantially the same effects as in the airbag apparatus recited in the above described form.

When mounting the connecting member on the airbag, in the first sub-step, the individual divided members are attached to the inner wall surface of the airbag at fitting sections provided between both ends of the divided members. Then, in the second sub-step, ends of the divided members are connected to each other. The operator can connect the divided members to each other while adjusting, for example, the distance between the divided members. When attaching the connecting member to the airbag, therefore, it is possible to easily adjust the length of each component part of the connecting member, and this is useful for making the operation run more smoothly.

DETAILED DESCRIPTION OF THE PREFERRED EMBODIMENTS

Figure 1:
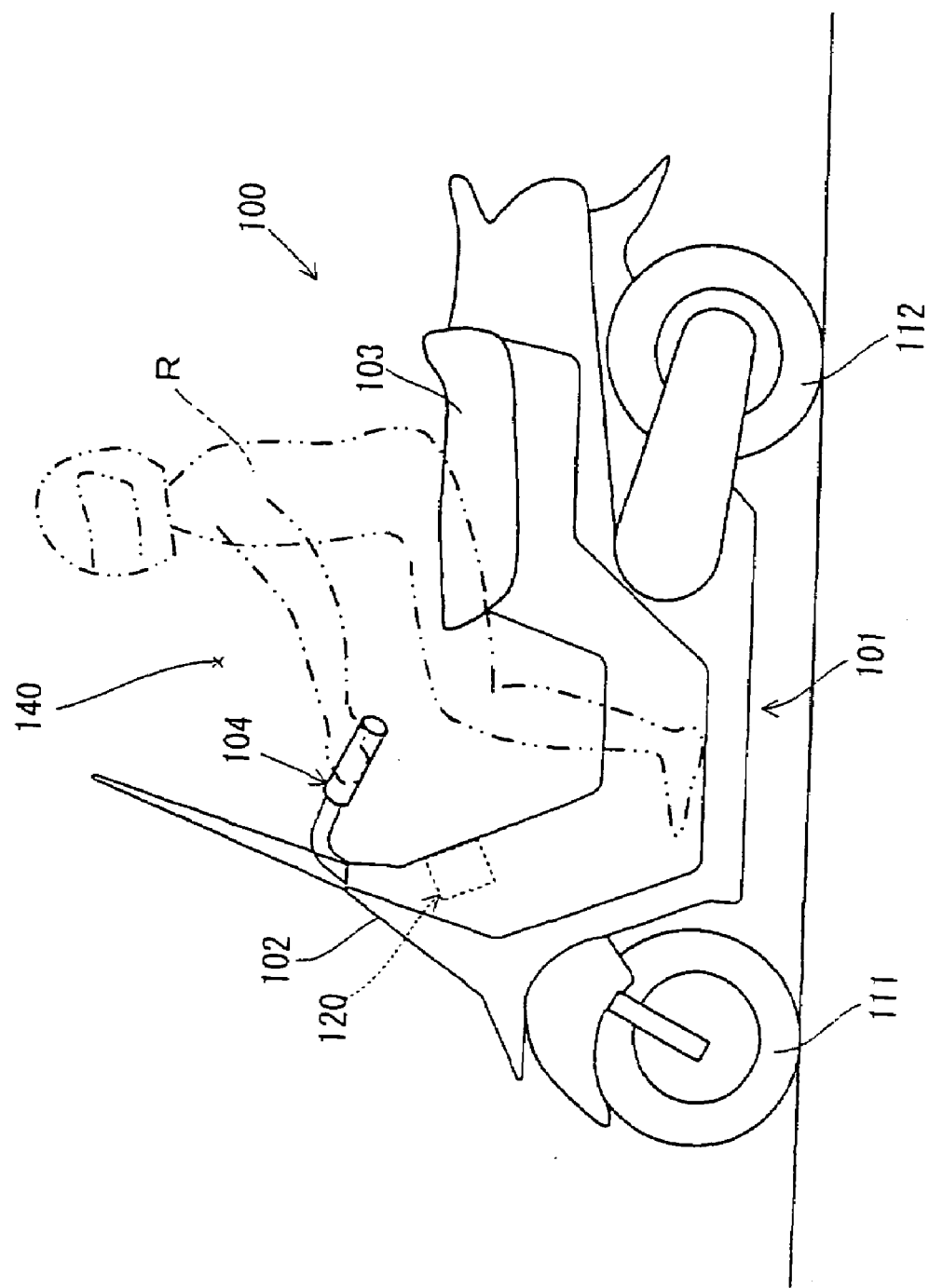
FIG. 1 illustrates a scooter-type automotive two-wheeler 100 of an embodiment of the present invention, as viewed from the driver side, showing an airbag apparatus 120 as mounted on an automotive two-wheeler 100.
Figure 2:
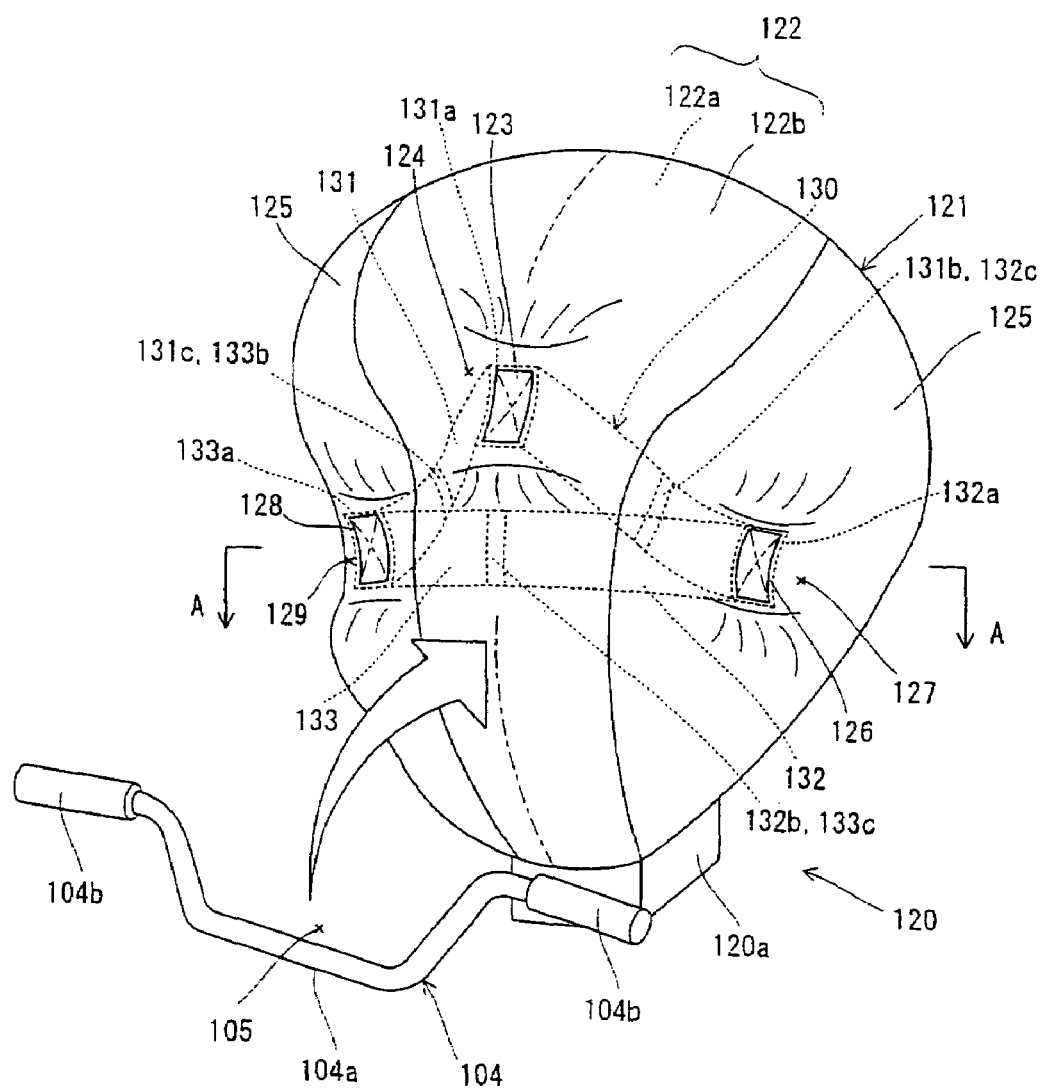
FIG. 2 schematically illustrates the relationship between the unfolded and inflated airbag 121 and the handle 104.
Figure 3:
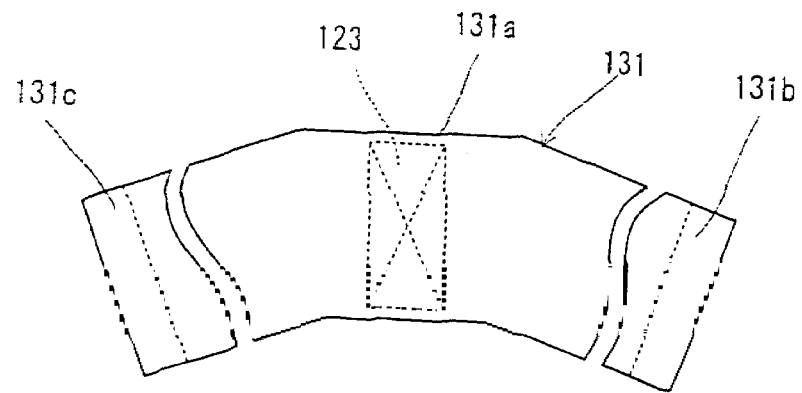
FIG. 3 is a plan view of the first tether component piece 131 shown in FIG. 2.
Figure 4:
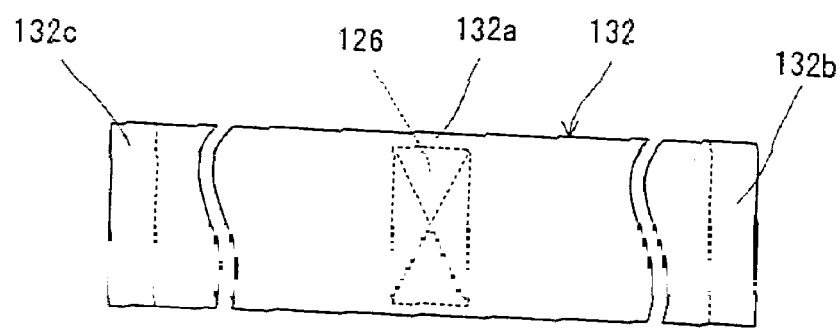
FIG. 4 is a plan view of the second tether component piece 132 shown in FIG. 2.
Figure 5:
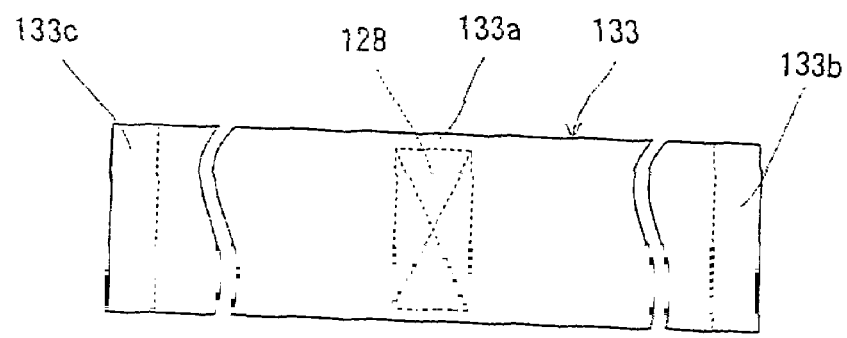
FIG. 5 is a plan view of the third tether component piece 133 shown in FIG. 2.
Figure 6:
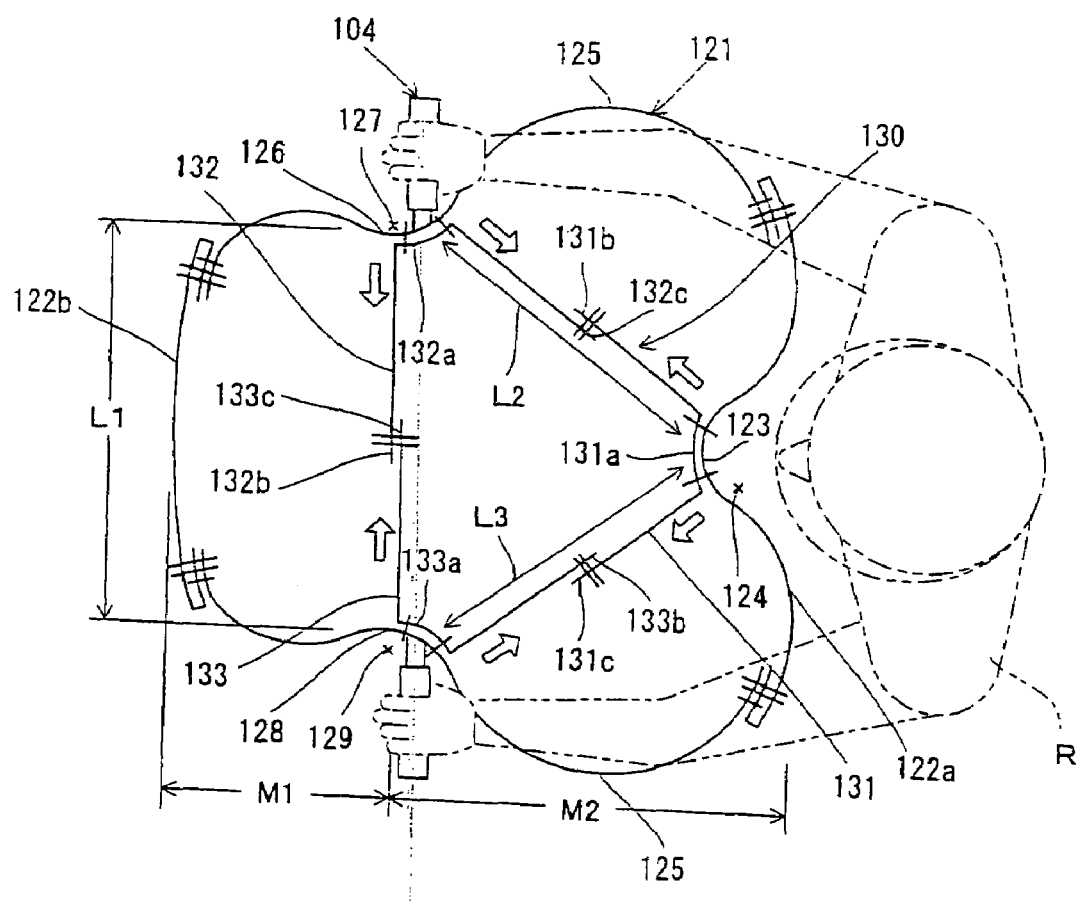
FIG. 6 illustrates a sectional structure of the airbag 121 shown in FIG. 2, cut along the line A-A, showing a state during inflation.

Embodiments of the present invention will now be described with reference to the figures. The configuration of an automotive two-wheeler 100 and an airbag apparatus 120 will be described with reference to FIGS. 1 to 6. FIG. 1 is a view of a scooter-type automotive two-wheeler illustrating an embodiment of the present invention as viewed from a side, in which an airbag apparatus 120 is mounted on the automotive two-wheeler 100. FIG. 2 schematically illustrates the relationship between an inflated airbag 121 and a handle 104. FIG. 3 is a plan view of a first tether component piece 131 shown in FIG. 2; FIG. 4 is a plan view of a second tether component piece 132 shown in FIG. 2; and FIG. 5 is a plan view of a third tether component piece 133 shown in FIG. 2. FIG. 6 illustrates a sectional structure of the airbag 121 shown in FIG. 2 cut along the line A-A, representing the state during inflation. The two-wheeler 100 of this embodiment falls under the category of "vehicle" or "motorcycle" in the present invention.

As shown in FIG. 1, the automotive two-wheeler 100 is configured as a scooter essentially comprising a body composing section 101 composed of an engine, a main frame and the like, a seat 103 capable of being straddled by a driver R, a handle 104, a front wheel 111 and a rear wheel 112.

The area above the body section 101 of the automotive two-wheeler 100 and in front of the driver R is defined as a driver-protecting area 140 upon the occurrence of a front collision of the automotive two-wheeler 100. In this embodiment, the term "front collision" includes forms of collision in which the automotive two-wheeler 100 collides with an object in front thereof (not shown for convenience). The term "driver protecting area 140" in this embodiment means an area corresponding to the "driver-protecting area" in the present invention. When the driver R is about to be thrown forward on the automotive two-wheeler under the effect of the kinetic energy generated upon the occurrence of a front collision, the "driver-protecting area 140" is defined as a space for restraining and protecting the driver R who is about to be thrown toward the front of the automotive two-wheeler 100.

An airbag apparatus 120, and various meters and switches are provided on a front section 102 of the body in the body section 101. The airbag apparatus 120 is arranged so as to face the above-mentioned driver-protecting area 140. That is, in this embodiment, the airbag apparatus 120 is arranged so that the projecting (unfolding and inflation) direction of the airbag 120, described later, is directed toward the front upward direction of the driver R.

As shown in FIG. 2, the airbag apparatus 120 essentially comprises a retainer 120a serving as an airbag container, an airbag 121 housed in the retainer 120a in a folded state, and an inflator (not shown for convenience) which feeds an expanding gas into the airbag 121 so as to cause the airbag 121 housed in the retainer 120a to unfold and inflate from the retainer 120a. A long strip-shaped webbing (for example, resin fibers fabricated into a belt) for connecting the airbag 121 and the body component members, although not shown, is attached to the airbag 121. The tension of this webbing acts on the unfolded and inflated airbag 121, whereby forward movement of the airbag 121 is regulated to generate a drag that is sufficient to restrain the driver R.

The airbag 121 has a main panel 122, and a right-left pair of side panels combined with both sides of the main panel 122. The main panel 122 is composed of a driver-side panel component cloth 122a arranged at a position facing the driver R upon the completion of unfolding and inflation, and a front-side panel component cloth 122b arranged on the body front side upon the completion of unfolding and inflation. The airbag 121 is formed, for example, by sewing the individual side panels 125 to both sides of the main panel 122.

The driver-side panel component cloth 122a in this embodiment constitutes the "vehicle rear side wall" in the present invention, and the front-side panel component cloth 122b constitutes the "vehicle front side wall" in the present invention. The right side panel 125 constitutes the "vehicle right side wall", and the left side panel 125 constitutes the "vehicle left side wall" in the present invention.

As shown in FIGS. 2 and 6, a tether 130 is provided in the airbag 121. This tether 130 corresponds to the "connecting member" in the present invention.

The tether 130 (strip-shaped fibrous cloth, also known as a tether strap) comprises a combination of a first tether component piece 131 (rear side tether), a second tether component piece 132 (side tether), and a third tether component piece 133 (side tether). Among the three tether component members, the second tether component piece 132 and the third tether component piece 133 have an identical shape. The first to third tether component pieces 131, 132 and 133 are composed, for example, of a base cloth. These first to third tether component pieces 131, 132 and 133 correspond to the "divided members" in the present invention.

In this embodiment, the first tether component piece 131 is sewn to the inner wall surface of the fitted section 123 of the driver-side panel component cloth 122a at a fitting section 131a. This fitted section 123 constitutes a wall portion facing the driver in the driver-side panel component cloth 122a, and corresponds to the "first wall portion" in the present invention. The second tether component piece 132 is sewn to the inner wall surface of the fitted section of the right side panel 125 shown to the right in FIG. 2 at a fitting section 132a, and the third tether component piece 133 is sewn to the inner wall surface of the fitted section 128 of the left side panel 125 in FIG. 2. Fitted sections 126 and 128 form wall portions other than the portion of the airbag 121 facing the vehicle front, and correspond to the "second wall portion" in the present invention. In this manner, the first to third tether component pieces 131, 132 and 133 composing the tether 130 are fitted to the inner wall surface of the airbag.

When forming the tether 130, an end 131b of the first tether component piece 131 and an end 132c of the second tether component piece 132 are sewn together; the other end 131c of the first tether component piece 131 and an end 133b of the third tether component piece 133 are sewn together; and the other end 132b of the second tether component piece 132 and the other end 133c of the third tether component piece 133 are sewn together. That is, in this configuration, the fitting sections 131a, 132a and 133a of the first to third tether component pieces 131 are shifted from the connecting points of these first to third tether component pieces 131. This embodiment corresponds to the term "the divided members are connected to each other at positions different from the fitting positions". This sewing permits achievement of the tether 130 in which the first to third tether component pieces 131, 132 and 133 are connected to each other.

Upon inflation of the airbag 121, the tether 130 can substantially form a triangle having, as shown in FIG. 6, fitting sections 131a, 132a and 133a serving as apexes, and three sides as viewed in planes L1, L2 and L3. More specifically, the tether 130 has a side L2 which linearly extends between the fitting section 131a and the fitting section 132a, a side L1 which linearly extends between the fitting section 132a and the fitting section 133a, and a side L3 which linearly extends between the fitting section 131a and the fitting section 133a. The side L1 extends in a direction perpendicular to the front-rear direction of the airbag 121 (vertical direction in FIG. 6), and the sides L2 and L3 extend in a direction crossing the front-rear direction of the airbag 121 (diagonal direction in FIG. 6).

The fitting sections 131a, 132a and 133a of the tether 130 are provided between both ends of the individual tether component pieces 131, 132 and 133, and correspond to the "fitting sections" or the "apexes" in the present invention.

In the inflated state of the airbag 121 shown in FIG. 6, the side L1 represents the portion connecting the inner wall surface of the fitted section 126 and the inner wall surface of the fitted section 128, and corresponds to the "first connecting section" in the present invention. The side L2 of the tether 130 represents the portion connecting the inner wall surface of the fitted section 126 or the side L1 and the inner wall surface of the fitted section 123. The side L3 of the tether 130 represents the portion connecting the inner wall surface of the fitted section 128 or the side L1 and the inner wall surface of the fitted section 123. These sides L2 and L3 therefore correspond to the "second connecting section connecting the first connecting section and the inner wall surface of the first wall" in the present invention.

Figure 7:
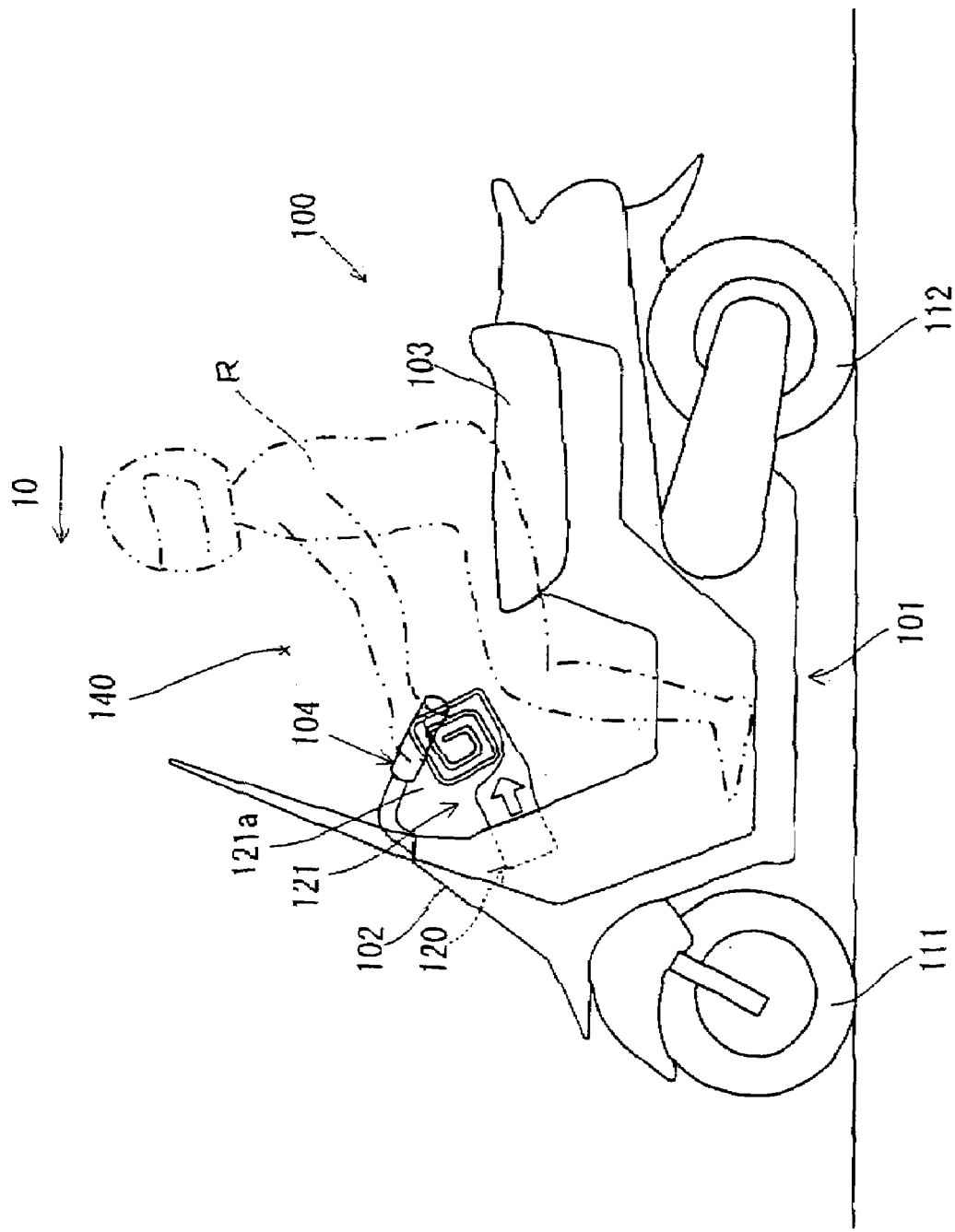
FIG. 7 illustrates a state in which unfolding and inflation of the airbag 121 have been started.
Figure 8:
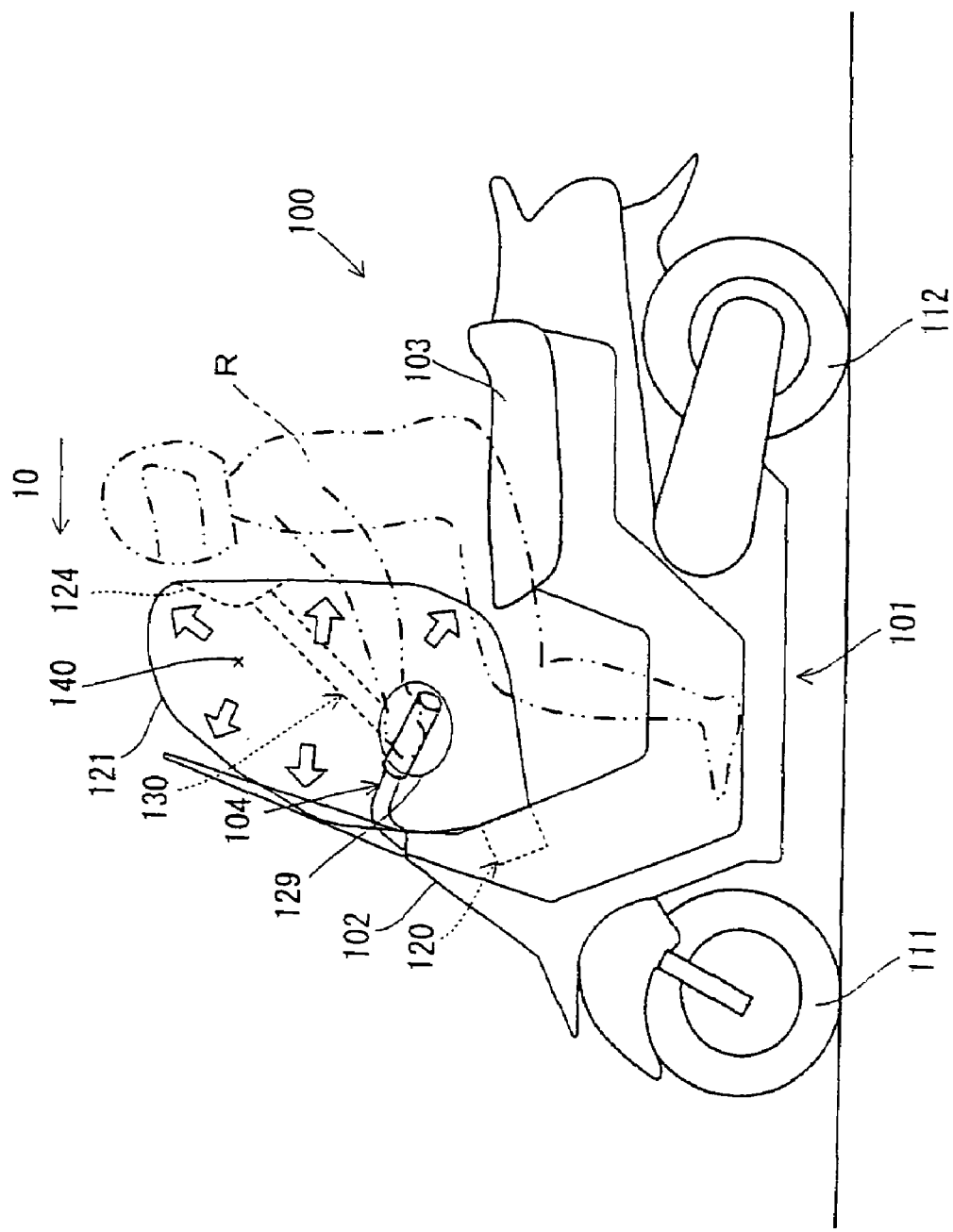
FIG. 8 illustrates a state in which inflation of the airbag 121 has been completed.
Figure 9:
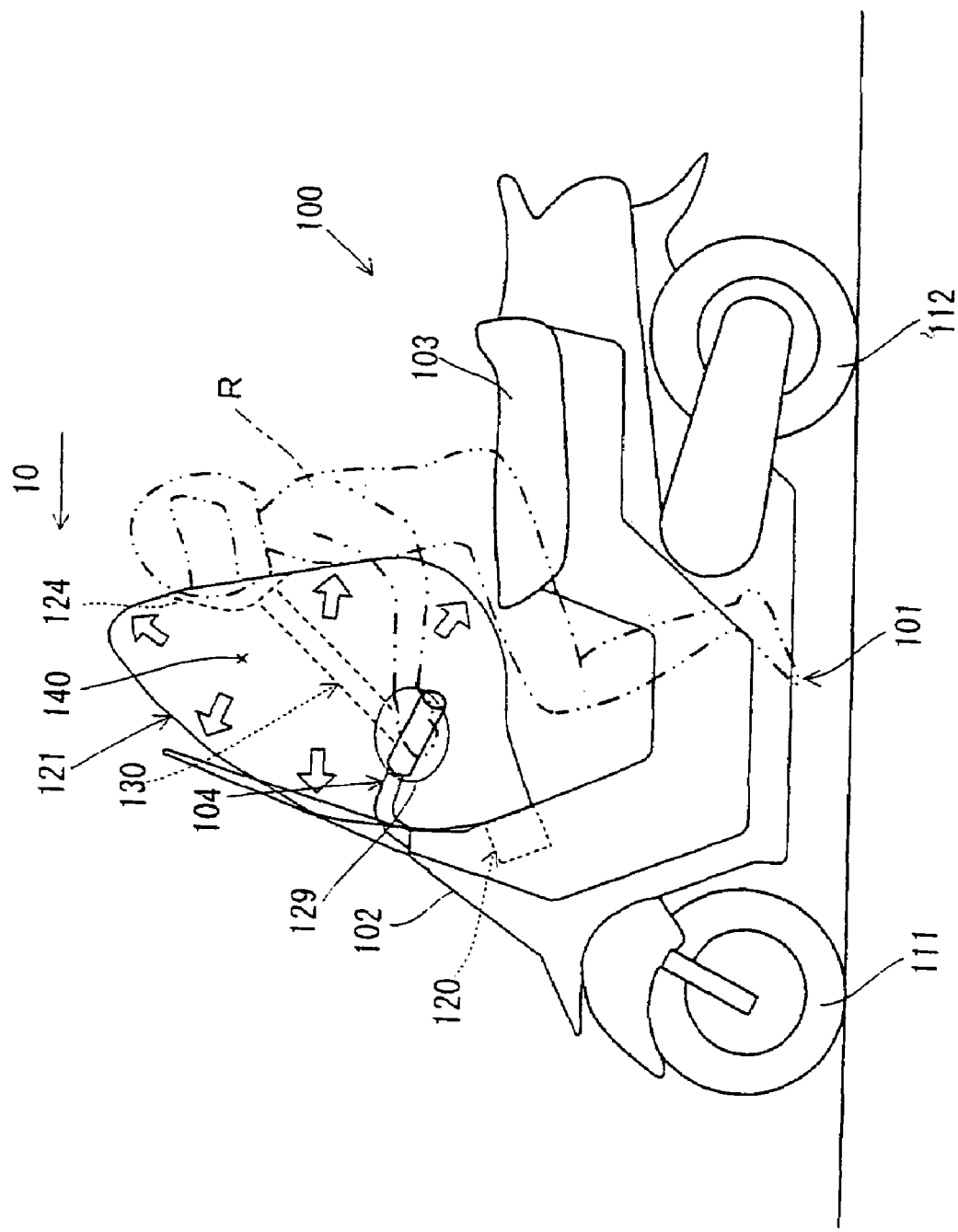
FIG. 9 illustrates a state in which the driver R is restrained by the inflated airbag 121.
Figure 10:
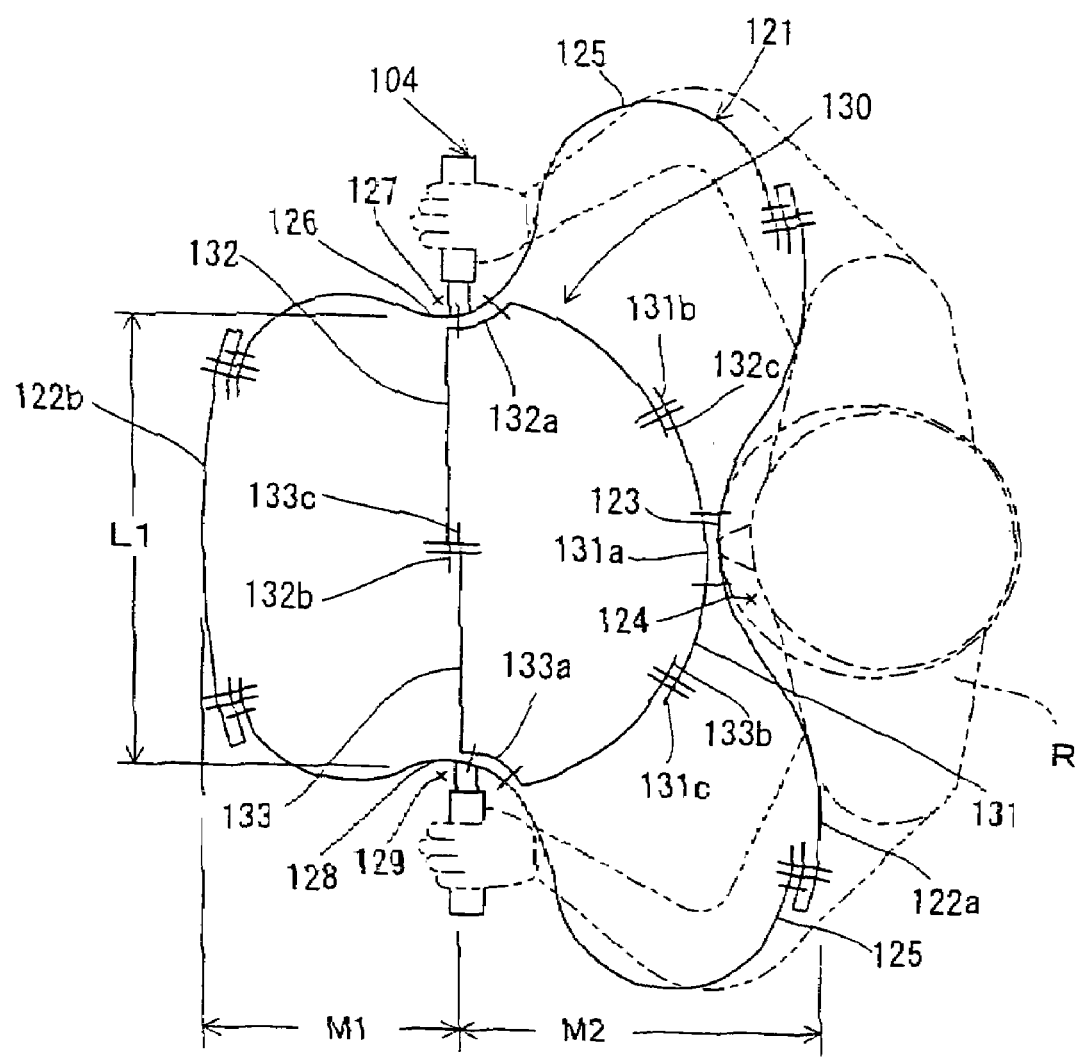
FIG. 10 illustrates a sectional structure of the airbag 121 shown in FIG. 2, cut along the line A-A, showing a state of the restrained driver.
Figure 11:
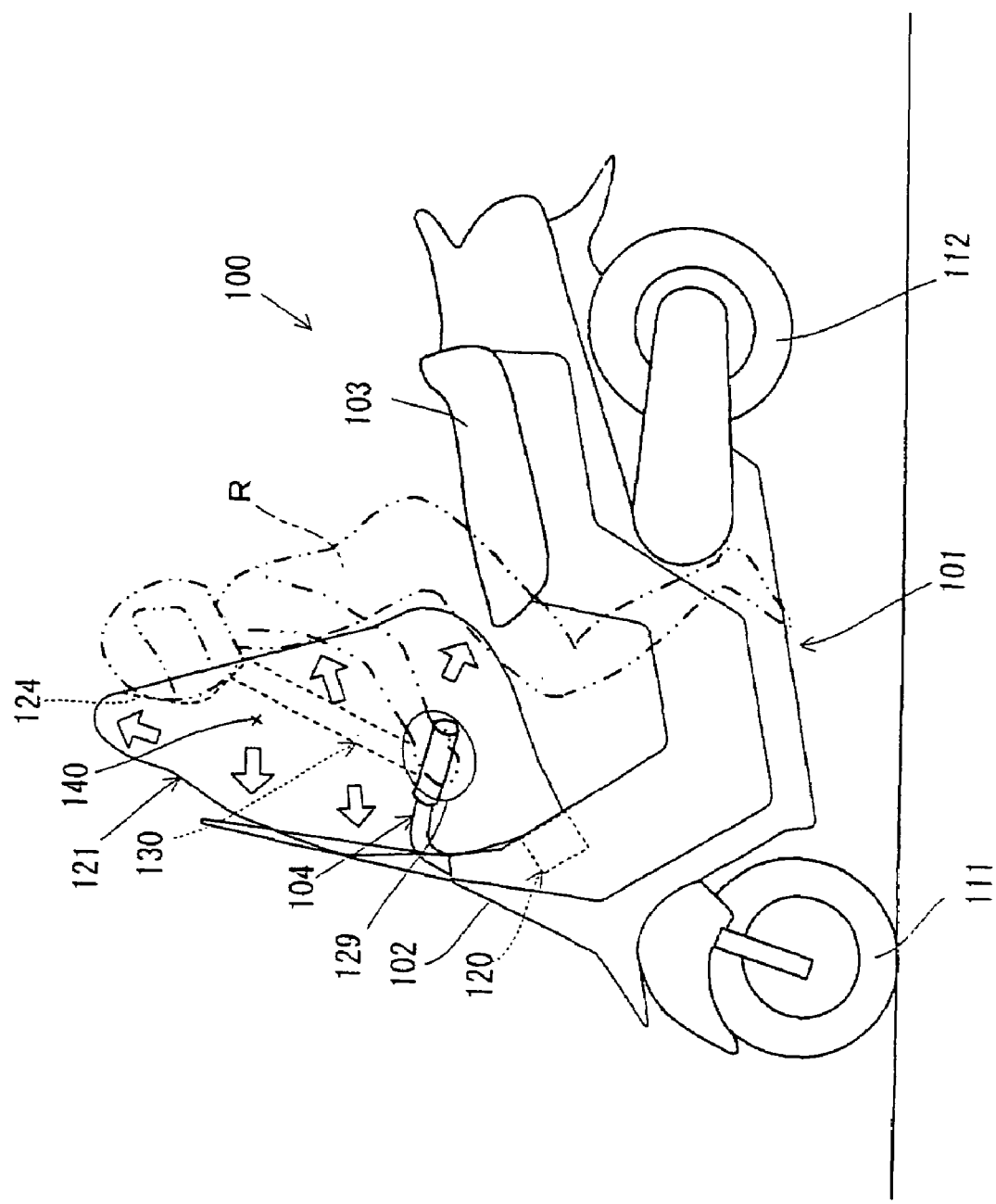
FIG. 11 illustrates a state of driver protection during pitching.

The operation of the airbag apparatus having the above-mentioned configuration will now be described with reference to FIGS. 2 and 6 to 11. FIG. 7 illustrates a state in which unfolding and inflation of the airbag 121 are started. FIG. 8 illustrates a state in which inflation of the airbag 121 has been completed. FIG. 9 illustrates a state in which the driver R is restrained by the inflated airbag 121. FIG. 10 illustrates a state during the restraining of the driver, showing a sectional structure of the airbag 121 shown in FIG. 2 cut along the line A-A. FIG. 11 illustrates the state of driver protection during pitching rotation.

When the automotive two-wheeler 100 causes a collision accident in the forward direction, as shown in FIG. 7, the driver R tends to move toward the front of the automotive two-wheeler 100 (for example, in the arrow 10 direction in FIG. 7) (thrown away). In this embodiment, projection (unfolding) of the airbag 121 is started from the retainer 120a toward the driver-protecting area 140 via an inflator (not shown) in response to the detection of this front collision. As shown in FIG. 7, a roll-retracting section 121a is formed so that the unfolded airbag 121 faces the driver-protecting area 140 with the shortest distance. Upon occurrence of an accident, the airbag 121 is unfolded while the roll-retracting section 121a rapidly unrolls from the retainer 120a toward the driver-protecting space 140. Inflated portions are thus sequentially formed from the retainer 120a side in the airbag as a result of continued feeding of an expanding gas into the airbag 121.

Thus, as shown in FIGS. 2 and 6 to 8, a state occurs in which the airbag 121 is completely unfolded and inflated.

When the airbag 121 is in this inflated state, as described above, the tether 130 substantially forms a triangle as shown in FIG. 6 in the airbag 121. In the airbag 121, a first area M1 is formed on the vehicle front side of the side L1 of the tether 130, and a second area M2 is formed on the vehicle rear side of the side L1 of the tether 130.

In this state, a tension as shown by an arrow in FIG. 6 (arrow on a dark background) acts on the tether 130. In the state in which such a tension acts on the tether 130, the main panel 122 and the side panel 125 of the airbag 121 are pulled by the tether 130 to regulate inflation in a specific direction. That is, in this embodiment, inflation of the driver-side panel component cloth 122a of the main panel 122 toward the driver R is regulated by the tether 130 at the fitted section 123. Inflation of the right and left side panels 125 along the right-left direction of the vehicle (vertical direction in FIG. 6) is regulated by the side L1 of the tether 130 (the second tether component piece 132 and the third tether component piece 133) at the fitted sections 126 and 128. On the other hand, if inflation of the airbag 121 at portions other than the fitted sections 123, 126 and 128 is allowed. Particularly in this embodiment, inflation of the first area M1 of the airbag 121 toward the vehicle front is not regulated by the tether 130 but allowed. Therefore, a concavity caused by a collapse of the front side panel component cloth 122b toward the inside of the airbag 121 never forms. This corresponds to the state in which "inflation of the vehicle rear side wall of the airbag toward the driver is regulated via the connecting member, and inflation of the vehicle front side wall of the airbag toward the vehicle front is allowed" in the present invention.

At this point in time, the driver-side panel component cloth 122a of the airbag 121 forms a concavity 124 through the collapse thereof toward the inside of the airbag 121 at the fitted section 123. This concavity 124 has a shape, for example, allowing the driver's R head (in practice, the helmet of the driver) to fit in. This concavity 124 is effective at restraining the driver R.

The side panel 125 collapses into the airbag 121 at the fitted sections 126 and 128 to form concavities 127 and 129. A shape engageable with the handle 104 in this embodiment is formed by these concavities 127 and 129 and the front side panel component cloth 122b therebetween. That is, the handle 104 in this embodiment extends in the right-left direction of the vehicle as shown in FIG. 2, and has a handle-operating section 104b at both ends of the handle frame 104a. The handle-operating sections form projections from the concavities 105 of the handle frame 104a. In this embodiment, the handle 104 comes into contact with the inflated airbag 121. In this contact state, the projecting handle-operating sections 104b fit into the concavities 127 and 129 of the side panel 125. These concavities 127 and 129 constitute the "engagement section" in the present invention. As a result, the airbag 121 reliably engages with the handle 104 upon inflation. Particularly in this embodiment, the side L1 of the tether 130 linearly extends between the concavities 127 and 129 upon inflation of the airbag 121. It is therefore easier to achieve engagement between the handle 104 and the airbag 121 since it is possible to maintain a constant length of the side L1.

As a result, as shown in FIGS. 9 and 10, when the automotive two-wheeler 100 undergoes a front collision, and the driver R tends to move in the frontward direction 10 due to the effect of kinetic energy caused by the collision, it is possible to reliably restrain the driver R with the inflated airbag 121 in the driver-protecting area 140.

More specifically, in this embodiment, the driver R is reliably restrained by the concavity 124 formed on the driver side panel component cloth 122a, thereby permitting better protection of the driver. In this embodiment, furthermore, inflation of the first area M1 toward the vehicle front is not regulated by the tether 130, providing an advantage that improves the restraining performance of the driver R. For example, when inflation of the airbag 121 is regulated by the tether 130 and a concavity is formed in the first area M1, a gap is formed between the airbag 121 and the vehicle body component members, thus risking of a loss of drag of the airbag 121. According to this embodiment, however, the drag of the airbag 121 can be improved compared with such a case. In this embodiment, the airbag 121 reliably engages with the handle 104 via the concavities 127 and 129 of the side panel 125, and the load acting from the driver R on the airbag 121 can be reliably received by the handle.

As shown in FIG. 11, upon the occurrence of a front collision, the automotive two-wheeler 100 may be subjected to pitching due to the effect of energy generated upon collision. In such a case, the shape of the concavities 124, 127 and 129 can be maintained by controlling the inflating direction of the airbag 121 by means of the tether 130 in the airbag apparatus 120 of this embodiment. This makes it possible for the airbag 121 to reliably restrain, as in the cases shown in FIGS. 9 and 10, the driver R who tends to be thrown away in the forward moving direction 10 during pitching, thereby permitting better driver protection.

In this embodiment, the adopted configuration is such that the tether 130 in the airbag 121 regulates the inflation of the main panel 122 toward the driver R in the airbag 121 and inflation of the portion of the side panel 125 corresponding to the handle 104. However, regarding the inflation-regulating direction of the airbag 121 by the tether 130, any of various other forms can be adopted. For example, although not shown, configurations for the adjustment of the inflated shape of the airbag 121 and control of the portion of the driver's body to be restrained first by the airbag 121 upon the occurrence of a front collision are widely applicable by attaching the tether 130 to the airbag at a position corresponding to the chest, abdomen or shoulder of the driver R.

When manufacturing an airbag apparatus 120 having the configuration described above, the tether 130 is installed in the airbag 121, for example, in the mounting step.

In the mounting step, the first to third tether component pieces 131, 132 and 133 are fitted to the inner wall surface of the airbag 121 by sewing as described above in the first sub-step (the "first step" in the present invention). In other words, the first to third tether component pieces 131, 132 and 133 are individually sewn at the fitting sections 131a, 132a and 133a to the fitted sections 123, 126 and 128 of the airbag 121.

Then in the second sub-step (the "second step" in the present invention), the first to third tether component pieces 131, 132 and 133 are connected to each other by sewing. That is, as shown in FIG. 6, the ends facing each other of these first to third tether component pieces 131, 132 and 133 are sewn together. As a result, the tether 130 which substantially forms a triangle upon inflation of the airbag is formed in the airbag 121. In this operation, the individual tether component pieces 131, 132 and 133 are connected while making an adjustment so that the intervals between the pieces L1, L2 and L3 have the desired values. For example, after adjusting the length of the side L1 of the tether 130 so that the shape of the vehicle rear side wall of the airbag 121 corresponds to the shape of the cavity 105 of the handle 104, the end 132b of the second tether component piece 132 and the end 133c of the third tether component piece 133 are sewn together. According to this fitting method of the tether 130, the operator can connect the individual tether component pieces 131, 132 and 133 to each other while adjusting the intervals between the pieces L1, L2 and L3 to the desired value, by sequentially performing the first sub-step and the second sub-step. This permits a smoother installing operation of the tether 130 in the airbag 121. The tether-sewing operation can be carried out more easily compared with a configuration in which the fitting sections 131a, 132a and 133a for fitting the individual tether component pieces 131, 132 and 133 to the inner wall surface of the airbag 121 agree in position with the portions at which the individual tether component pieces 131, 132 and 133 are connected to each other.

According to this embodiment, as described above, it is possible to provide an airbag apparatus 120 useful for improving the protection of the driver by regulating the inflation of the vehicle rear side wall of the airbag 121 toward the driver, as well as by using a tether 130 having a configuration that allows the vehicle front side wall of the airbag 121 to be inflated toward the vehicle front. That is, in this embodiment, the driver-restraining performance of the airbag 121 can be improved by ensuring engagement of the inflated airbag 121 with the vehicle body component members such as the handle 104 and the panel 105 due to the effect of the tether 130. Particularly in this embodiment, it is possible to improve the protection of the driver by appropriately fitting the tether 130 to the inner wall of the airbag 121 so that the tether 130 does not regulate (do allow) inflation of the first area M1 of the airbag 121.

According to this embodiment, the length in the right-left direction of the inflated airbag 121 can be kept uniform by the side L1 of the tether 130. It is therefore possible to obtain a stable driver-restraining performance of the airbag 121 compared with the case where the length of the inflated airbag 121 in the right-left direction is not kept constant.

According to this embodiment, furthermore, the configuration is such that the tether 130 forms a triangle upon inflation of the airbag 121. The tension acting on the tether 130 can therefore be dispersed in a manner that maintains good balance. It is thus possible to achieve a satisfactory configuration of the tether 130. For example, this permits achievement of a configuration in which there is a low necessity to change the width and thickness of the tether 130 at various portions in response to the tension acting on the various portions.

According to this embodiment, having a configuration in which the fitting sections 131a, 132a and 133a of the first to third tether component pieces 131 are shifted from the connecting sections at which the first to third tether component pieces 131 to each other, the length of the sides L1, L2 and L3 of the tether 130 can be easily adjusted. For example, when the fitting sections 131a, 132a and 133a of the first to third tether component pieces 131 correspond to the connecting sections at which the first to third tether component pieces 131 are connected to each other, it is necessary to simultaneously conduct fitting of the first to third tether component pieces 131 and adjust the length of the sides L1, L2 and L3 of the tether 130 and, which requires a complex operation. This embodiment makes it possible to solve such a problem, and eases the fitting operation of the tether 130.

The present invention is not limited to the above-mentioned embodiment, but various applications and variants are possible. For example, the following embodiments are possible by applying the above-mentioned embodiment.

In the above-mentioned embodiment, the airbag apparatus 120 having the tether 130 fitted in the airbag 121 has been described. However, the configuration of the tether can be varied as required. Variations of the airbag will now be described with reference to FIGS. 12 and 13, which schematically illustrate the configuration of the airbag of another embodiment. In these drawings, the same component parts as in FIG. 6 are assigned the same reference numerals, and a detailed description will be omitted here.

Figure 12:
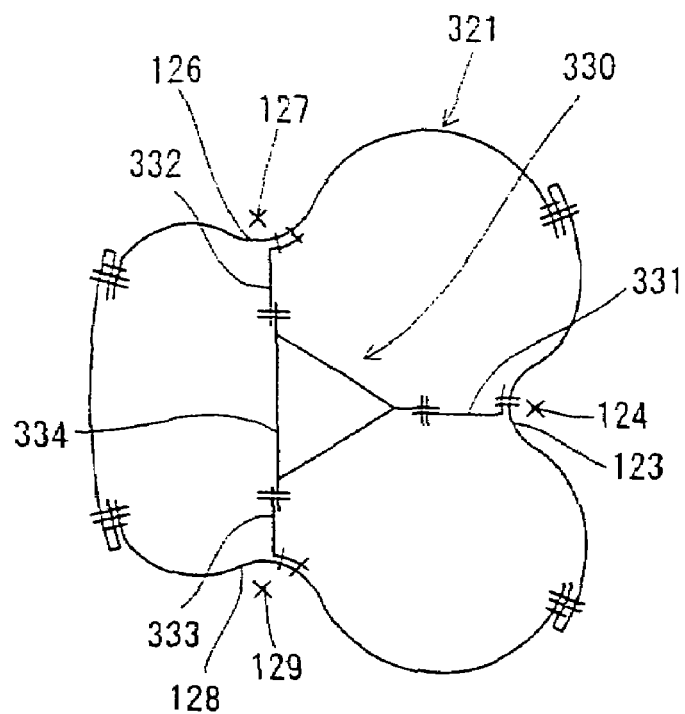
FIG. 12 schematically illustrates the configuration of an airbag 321 of another embodiment.

As an airbag in which a part of the tether forms a closed shape, an airbag 321 having the configuration as shown in FIG. 12 can be used. A tether 330 fitted to the inner wall surface of this airbag 321 is composed of first to fourth tether component pieces 331, 332, 333 and 334 (corresponding to the "divided members" in the present invention). In this embodiment, the inner wall surface of the fitted section 126 of the airbag 321 and the inner wall surface of the fitted section 128 are connected by the second to fourth tether component pieces 332, 333 and 334, and further, the fourth tether component piece 334 and the inner wall surface of the fitted section 123 of the airbag 321 are connected. In other words, these points including the fitted sections 123, 126 and 128 are connected by the first to fourth tether component pieces 331, 332, 333 and 334. The fourth tether component piece 334 is arranged at substantially at the center position in the inflated airbag 321, and forms a closed triangular shape.

Figure 13:
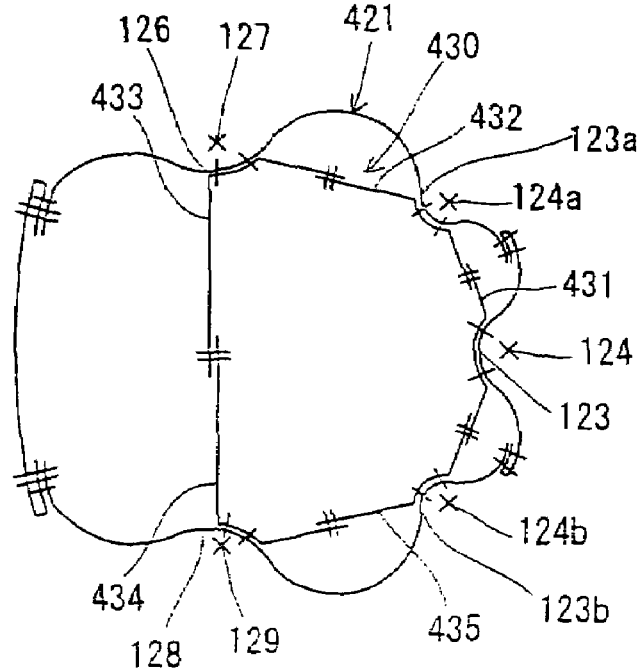
FIG. 13 schematically illustrates the configuration of an airbag 421 of still another embodiment.

As an airbag of which the tether forms a polygon other than a triangle, for example, an airbag 421 having the configuration as shown in FIG. 13 can be used. The tether 430 fitted to the inner wall surface of this airbag 421 is composed of first to fifth tether component pieces 431, 432, 433 and 435 (corresponding to the "divided members" in the present invention), and forms a closed pentagon. In this embodiment, five points including fitted sections 123, 123a, 123b, 126 and 128 are connected by the first to fifth tether component pieces 431, 432, 433 and 435. In this embodiment, concavities 124a and 124b are formed on the airbag 421 due to the effect of a tension at the fitted sections 123a and 123b. The driver-restraining performance can be improved by providing these concavities 124a and 124b at a position corresponding to the shoulder or the chest of the driver.

The same advantages as those of the airbag 121 are available, in terms of the regulation of the airbag inflation toward the driver and the handle by means of the tether and the allowance of inflation toward the front vehicle, also from the airbag 321 or 421 having the above-mentioned configuration.

The scooter-type automotive two-wheeler 100 has been described in the above-mentioned embodiments. The present invention is however applicable also to other types of motorcycle, and furthermore, to vehicles other than motorcycles.

According to the present invention, an airbag configuring technique useful for improving protection of a driver upon the occurrence of a vehicle accident and related techniques are achieved.

What is claimed is:

1. An airbag apparatus for a motorcycle having a steering handle, the airbag apparatus comprising:
   an airbag for being inflated having a rear wall portion for facing a driver of the motorcycle, an opposite front wall portion for facing away from the driver, and laterally facing opposite side wall portions generally extending between the front and rear wall portions;
   a connecting member in the airbag for controlling inflation thereof in a predetermined manner;
   predetermined airbag connecting locations at which the connecting member is attached to the airbag; and
   an upper concavity in the rear wall portion, and intermediate height concavities in the opposite side wall portions with the upper concavity being higher than the intermediate height concavities so that the upper concavity is adapted to receive the driver and the intermediate height concavities are adapted to fit operating ends of the motorcycle handlebar therein upon airbag deployment and inflation during emergency conditions, wherein the connecting member includes a plurality of divided members that are attached to the airbag at the airbag connecting locations and that are attached to each other at locations other than the airbag connecting locations.

2. The airbag apparatus of claim 1 wherein the predetermined airbag connecting locations include one location at the rear wall portion facing the driver, and at least one other location that is displaced from the opposite front wall portion facing away from the driver.

3. The airbag apparatus of claim 1 wherein the connecting member includes a first connecting section that connects the lateral wall portions of the airbag, and a second connecting section that connects the first connecting section and the rear wall portion of the airbag facing the driver.

4. The airbag apparatus of claim 1 wherein the connecting member has a polygonal shape so that at least one of the airbag connecting locations is an apex of the polygonal connecting member.

5. The airbag apparatus of claim 4 wherein the polygonal shape comprises a triangle formed by the connecting member in the airbag.

6. The airbag apparatus of claim 5 wherein the airbag connecting locations are three apexes of the triangular shaped connecting member.

7. The airbag apparatus of claim 1 in combination with the motorcycle.

8. A motorcycle including an airbag apparatus, the motorcycle comprising:
handlebars having laterally spaced, operating end portions;
a seat for a driver rearwardly of the handlebars;
an airbag of the airbag apparatus for being inflated between the seat and the handlebars;
a connecting member in the airbag for controlling inflation thereof in a predetermined manner;
a forward portion of the airbag that the connecting member allows to substantially freely inflate toward the handlebars;
a rearward portion of the airbag whose inflation rearwardly is regulated by the connecting member;
lateral side portions of the airbag generally extending between the forward and rearward portions thereof;
a rear concavity in the rearward portion of the inflated airbag configured for receiving a body portion of the driver; and
side concavities in the lateral side portions of the inflated airbag configured for fitting the corresponding ones of the handlebar operating end portions therein,
wherein the connecting member includes a plurality of divided members attached to each other at locations spaced from the airbag to allow the length of the connecting member to be adjusted so that the predetermined manner in which the connecting member controls airbag inflation is varied.

9. The motorcycle of claim 8 wherein the rearward portion of the airbag includes a rear side that faces the driver upon airbag inflation, and the connecting member is attached to the rear side of the airbag rear portion to form the rear concavity in the rear side adapted to receive a body portion of the driver upon occurrence of a forward collision of the vehicle.

10. The motorcycle of claim 8 wherein the connecting member is attached at predetermined locations to the airbag such that the airbag front portion is sized to fit between the laterally spaced end portions of the motorcycle handlebars.

11. The motorcycle of claim 10 wherein the predetermined locations are at either lateral side of the airbag generally intermediate the front and rear portions thereof.

12. The motorcycle of claim 11 wherein the airbag includes the side concavities at the predetermined locations adapted for filling the end portions of the handlebars therein.

13. The motorcycle of claim 11 wherein the connecting member includes a section thereof that extends linearly between the predetermined side locations with the connecting member section sized to approximate the lateral spacing between the end portions of the handlebars.

14. The motorcycle of claim 8 wherein the connecting member extends linearly generally normal to a fore and aft direction along the motorcycle to be connected at opposite lateral sides of the airbag to keep the inflated airbag stable in a lateral direction corresponding to the linearly extending connecting member as the driver engages the airbag during accident conditions.

15. The motorcycle of claim 8 wherein the rear concavity is higher along the inflated airbag than the side concavities.

16. An airbag apparatus for a motorcycle having a seat for a driver rearwardly of handlebars, the airbag apparatus comprising:
an airbag for being inflated between the seat and the handlebars;
a connecting member in the airbag for controlling inflation thereof in a predetermined manner;
a forward portion of the airbag that the connecting member allows to substantially freely inflate toward the handlebars; and
a rearward portion of the airbag whose inflation toward the driver is regulated by the connecting member,
wherein the rearward portion of the airbag includes a rear side that faces the driver upon airbag inflation, and the connecting member is attached to the rear side of the airbag rear portion to form a concavity in the rear side adapted to receive a body portion of the driver upon occurrence of a forward collision of the vehicle, and the connecting member is attached at three locations along the rear side to form three corresponding concavities therein with a central cavity for receiving the drivers head, and a cavity on each side of the central cavity for receiving the shoulders or chest of the driver.

* * * * *

UNITED STATES PATENT AND TRADEMARK OFFICE
CERTIFICATE OF CORRECTION

PATENT NO.       : 7,264,270 B2
APPLICATION NO.  : 10/811736
DATED            : September 4, 2007
INVENTOR(S)      : Yasuhito Miyata, Tadahiro Igawa and Tomohiro Sawa It is certified that error appears in the above-identified patent and that said Letters Patent is hereby corrected as shown below:

Claim 12, Column 14, line 19, delete "filling" and insert -- fitting -- therefor Signed and Sealed this Eighteenth Day of March, 2008

JON W. DUDAS
*Director of the United States Patent and Trademark Office*